US010900779B2

(12) United States Patent
Wang et al.

(10) Patent No.: US 10,900,779 B2
(45) Date of Patent: Jan. 26, 2021

(54) METHOD FOR THE RAPID DETECTION OF THE LINEAR AXIS ANGULAR ERROR OF AN NC MACHINE TOOL (71) Applicant: Dalian University of Technology, Dalian (CN)

(72) Inventors: Yongqing Wang, Dalian (CN); Kuo Liu, Dalian (CN); Jiakun Wu, Dalian (CN); Haibo Liu, Dalian (CN); Zhisong Liu, Dalian (CN); Haining Liu, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 124 days.

(21) Appl. No.: 16/462,238

(22) PCT Filed: Jan. 23, 2018

(86) PCT No.: PCT/CN2018/073694
§ 371 (c)(1),
(2) Date: May 19, 2019

(87) PCT Pub. No.: WO2019/144254
PCT Pub. Date: Aug. 1, 2019

(65) Prior Publication Data
US 2020/0064126 A1    Feb. 27, 2020

(51) Int. Cl.
*G01B 21/24*    (2006.01)
*G01M 13/02*    (2019.01)
*G01B 11/27*    (2006.01)

(52) U.S. Cl.
CPC .............. *G01B 21/24* (2013.01); *G01B 11/27* (2013.01); *G01M 13/02* (2013.01)

(58) Field of Classification Search
CPC ....... G01B 11/27; G01B 21/24; G01M 13/02; G01M 13/025
See application file for complete search history.

(56) References Cited

U.S. PATENT DOCUMENTS 5,834,623 A * 11/1998 Ignagni ................ G05B 19/401
702/105
7,430,460 B2 * 9/2008 Price ...................... G01C 19/42
244/180

(Continued)

FOREIGN PATENT DOCUMENTS

| CN | 101913103 A | 12/2010 |
| CN | 103162645 A | 6/2013 |
| CN | 108362493 A | 8/2018 |

*Primary Examiner* — Violeta A Prieto
(74) *Attorney, Agent, or Firm* — Muncy, Geissler, Olds & Lowe, PC (57) ABSTRACT A method for the rapid detection of the linear axis angular error of an NC machine tool, belongs to the technical field of NC machine tool testing. Firstly, the measuring device is mounted on the linear axis. Then, the linear axis moves at three different speeds at a constant speed, and the upper measurement system automatically performs multi-channel acquisition and storage of the motion measurement's point measurement data. Then, based on the same geometric error signal, it is decomposed into the different frequency components, and the measurement angle error is filtered at the different speeds. Finally, the measurement angle errors at the three speeds after filtering are superimposed to complete the rapid measurement of the linear axis angular error of the machine tool. The measurement efficiency is high and data processing capability is strong.

1 Claim, 7 Drawing Sheets (56) References Cited

U.S. PATENT DOCUMENTS

| | | | |
|---|---|---|---|
| 10,571,259 B2* | 2/2020 | Jywe | G01B 21/042 |
| 2013/0115857 A1* | 5/2013 | Huang | G01M 13/025 |
| | | | 451/8 |
| 2014/0182150 A1* | 7/2014 | Nishikawa | G01B 5/20 |
| | | | 33/503 |
| 2017/0226708 A1 | 8/2017 | Fujimoto | |
| 2018/0299263 A1* | 10/2018 | Jywe | G01B 21/042 |
| 2020/0064125 A1* | 2/2020 | Wang | G01B 11/27 |
| 2020/0132140 A1* | 4/2020 | Schnaase | G01B 7/31 |

* cited by examiner

METHOD FOR THE RAPID DETECTION OF THE LINEAR AXIS ANGULAR ERROR OF AN NC MACHINE TOOL

TECHNICAL FIELD

The invention belongs to the technical field of NC machine tools, and particularly relates to a rapid detection method of the linear axis angular error of an NC machine tool.

BACKGROUND

The angular error of the linear axis of a machine tool is the characteristic of the deflection angle of the kinematic pair. It is an important index for evaluating the geometric accuracy of a machine tool. Its size directly affects the machining quality of the workpiece and gradually increases during the service life of the machine tool. Therefore the acquisition of the linear axis angular error is of great significance for the evaluation of the geometric accuracy of a machine tool and the timely maintenance of the machine tool. For this reason, the detection of the linear axis angular error is included in the various types of machine tool accuracy inspection standards. In actual production, the machine tool manufacturer and the user will use a laser interferometer, a ball bars and other testing instruments to periodically measure the angular error of the linear axis of the machine tool. However, due to the large volume, high cost, complicated debugging, and long measurement time of the detection devices, the accuracy of the machine tool is seriously restricted, which affects the normal production process. This is especially a problem for a production line, where frequent downtime is resolutely avoided. Therefore, there is an urgent need to find a rapid detection method for the linear axis angular error of NC machine tools.

The research shows that the rapid detection of the linear axis angular error of NC machine tools should meet the basic conditions of high measurement efficiency, strong data processing capability, small device size, low price, convenient installation and debugging, and it poses great engineering challenges. The angular velocity of the kinematic pair is obtained using a gyroscope, the integral of which is used to obtain the motion deflection angle, and then the deflection angle measured by the accelerometer is used to correct, then the linear axis angular error can be rapidly obtained, which provides the possibility for rapid detection of the linear axis angular error of NC machine tools.

In 2013, LiLi and Hongwei Xia of the Harbin Institute of Technology, in the patent invention CN103234512A, disclosed a high-precision attitude angle and angular velocity measuring device for a three-axis air floating platform. The method uses a smart probe, a gyroscope, a four-sided prism, and a laser tracker. The angle and angular velocity information is obtained and the method achieves a high-precision dynamic measurement using the Kalman filter algorithm. However, this method requires many measuring devices, needs complicated debugging and the measurements are time consuming. In 2010, Beijing Sanchi Technology Development Ltd. disclosed a method to compensate for the accuracy of an inertial measurement unit in the patent CN102135431A. The method uses the angular velocity information that is outputted by fiber optic gyroscopes and the attitude and heading reference system calculates the attitude angle according to the angular velocity information. However, this method requires an expensive device and is susceptible to external disturbances such as temperature changes, and therefore cannot meet the detection requirements of the linear axis angular error of an NC machine tool under complicated working conditions.

SUMMARY

The object of the invention is to overcome the deficiencies of the prior methods, and to solve the problem of rapid detection of the linear axis angular error of an NC machine tool, by the invention of a rapid detection method for the linear axis angular error of a machine tool. The devices that are used in the method are accelerometers and gyroscopes, and they have the advantages of low susceptibility to interference and high detection efficiency. The device only has a few components; the components are small, are low cost, have a compact structure and a simple assembly process. The method uses accelerometers to detect the gravity vector component, then determine the installation error, and provide a basis for the correction of the measurement angle error. The accelerometer is used to measure the angular error, based on the Kalman filter, to correct the measurement result of the gyroscopes, thereby increasing the measurement accuracy; using the noise distribution law of the same angular error at different speeds, the high Signal to Noise Ratio (SNR) component is preserved by the filtering. Based on the principle of the continuous distribution of spatial frequency, and fusing of the measurement data with a high SNR bandwidth at each speed to increase the measurement bandwidth; the measurement system is installed on the linear axis of the machine tool. The device can realize the rapid detection of the linear axis angular error of the machine tool, its operation is simple, the equipment's integration is high, and it is easy to automate.

Technical Solution of the Invention

A rapid detection method for the linear axis angular error of an NC machine tool, using gyroscopes and accelerometers to measure the deflection angle of the linear axis' uniform motion, and then calculate the pitch angle error, yaw angle error and roll angle error of the linear axis. Firstly, the measuring device is mounted on the linear axis, and the initial angular error generated by the installation is determined by the accelerometers. Then, the linear axis moves at three different speeds at a constant speed, and the data acquisition card automatically performs multi-channel acquisition and storage of the motion measurement's point measurement data. The Kalman filter principle is used to combine the accelerometer and gyroscope measurement angle information to obtain the angular error measured at the three speeds. Then, based on the same geometric error signal, it is decomposed into the different frequency components, and the measurement angle error is filtered at the different speeds. Finally, the measurement angle errors at the three speeds after filtering are superimposed to complete the rapid measurement of the linear axis angular error of the machine tool.

The specific steps are as follows:

The first step is to assemble a rapid detection device for the linear axis angular error of NC machine tools.

Figure 1:
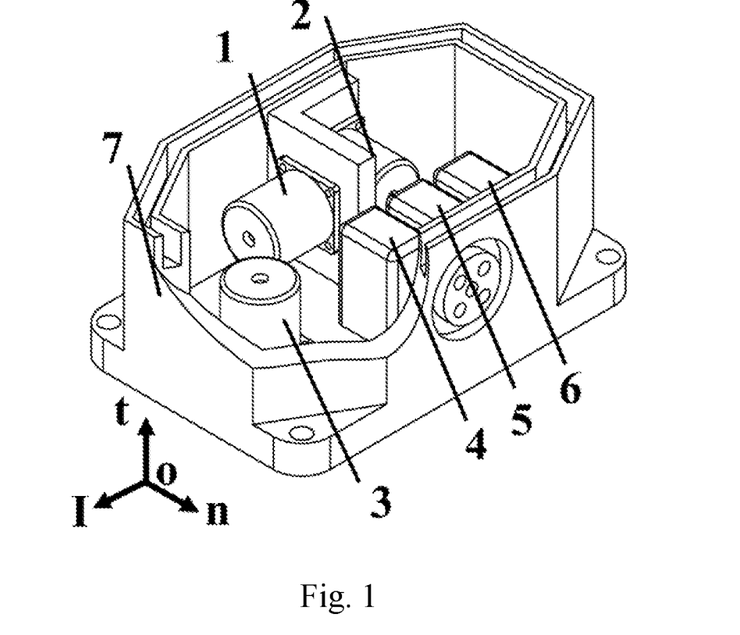
FIG. 1 shows a block diagram of a rapid geometric accuracy detection device.
Figure 2:
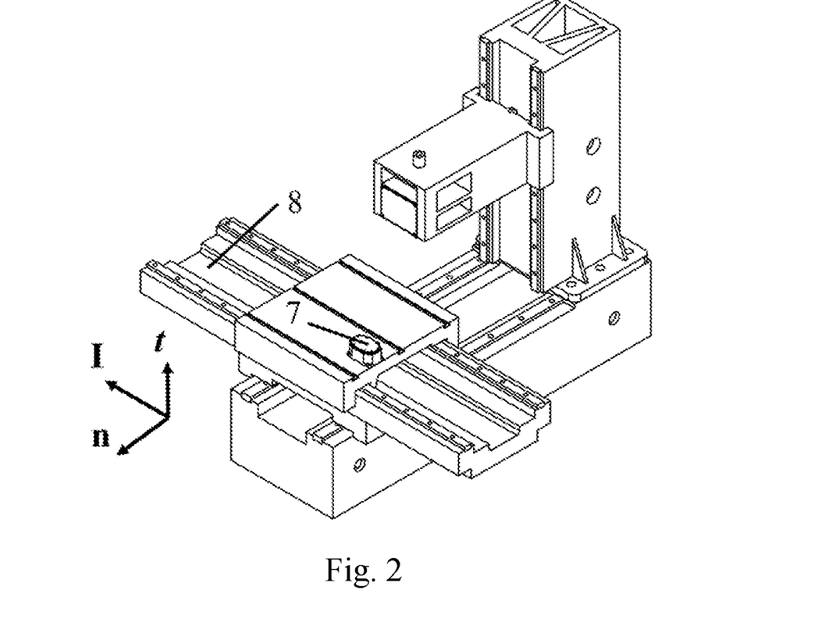
FIG. 2 shows a detection diagram of the rapid geometric accuracy detection device.

A three-axis accelerometer is used, consisting of three single-axis accelerometers: $1^{\#}$ single-axis accelerometer 1, $2^{\#}$ single-axis accelerometer 2, and $3^{\#}$ single-axis accelerometer 3; Three gyroscopes are used to constitute a three-axis gyroscope: $4^{\#}$ single-axis gyroscope 4, $5^{\#}$ single-axis gyroscope 5, and $6^{\#}$ single-axis gyroscope 6. Then ensure that the measurement direction of $1^{\#}$ single-axis accelerometer 1 is the I direction; 2# single-axis accelerometer 2 measurement direction is then direction; 3# single-axis accelerometer measurement direction is the t direction. Ensure that the 4# single-axis gyroscope 4 measures the rotation angle around the n direction's coordinate axis, the starting edge of the angle is the I coordinate axis, and clockwise rotation is positive. Ensure that 5# single-axis gyroscope 5 measures the rotation angle around the t direction coordinate axis, the starting edge of the angle is the I coordinate axis, and counterclockwise rotation is positive. Ensure that 6# single-axis gyroscope 6 measures the rotation angle around the I direction coordinate axis, the starting edge of the angle is the t coordinate axis, and clockwise rotation is positive. Ensure that the three single-axis accelerometers and the three single-axis gyroscopes are fixed in detection box 7 using nuts; detection box 7 is then fixed on the linear shaft using the side flanges, and the clamping device of the linear axis 8 of the numerical control machine tool is then completed.

The second step is the measurement the installation error of the measuring device.

First, control the linear axis I of the NC machine and move it to either end of its track. Then, the data acquisition system of the upper computer stores the measurement data of each 1# single-axis accelerometer 1, 2# single-axis accelerometer 2 and 3# single-axis accelerometer 3 which are $a_{c0}^1$, $a_{c0}^2$, $a_{c0}^3$ respectively, and the pitch angle error $\alpha_c$ and the roll angle error $\gamma_c$ of the measuring device are then obtained from equation (1):

$$\begin{cases} \alpha_c = \arcsin\left(-\dfrac{a_{c0}^1}{g}\right) \\ \gamma_c = \arcsin\left(\dfrac{a_{c0}^2}{g \times \cos(\alpha_c)}\right) \end{cases} \quad (1)$$

where g is the acceleration due to gravity of the measurement position. Then adjust the flange nut of the test box until the pitch angle error $\alpha_c$ and the roll angle error $\gamma_c$ are within 0.1°;

The third step is the measurement of the linear axis angular error of the NC machine tool.

First, set val(val=max,mid,min) as the measuring speed of the measuring device. The three measuring speeds are high speed, medium speed and low speed. Then, the measuring device is orientated in the I direction at high speed, medium speed and low speed from one side to the other of the linear axis. At the same time, the data acquisition system of the upper computer stores the coordinates of each measuring point and outputs the digital signal data at a high frequency; wherein the moving speed is calculated from equation (2):

$$\begin{cases} v_{max} = V_{max} \\ v_{mid} = \dfrac{V_{max}}{5} \\ v_{min} = \dfrac{V_{max}}{25} \end{cases} \quad (2)$$

where, $V_{max}$ is the maximum feed rate of the motion axis; the sampling frequency of the accelerometer under the high speed motion of the linear axis is $f_{max}$, the sampling frequency of the accelerometer under the middle speed motion of the linear axis is $f_{mid}$, the sampling frequency of the accelerometer under the low speed motion of the linear axis is $f_{min}$ which can be obtained from equation (3):

$$\begin{cases} f_{max} = \dfrac{v_{max}}{0.5} \times 4 \\ f_{mid} = \dfrac{f_{max}}{v_{max}} \times v_{mid} \\ f_{min} = \dfrac{f_{max}}{v_{max}} \times v_{min} \end{cases} \quad (3)$$

For the measurement obtained from the acceleration subset $A_{k,val} = \{(a_{i,val}^k, t_{i,val}^k), i \in [1,r], k \in [1,2,3], val \in [max, mid, min]\}$ and the angular rate subset $\Omega_{k,val} = \{(\omega_{i,val}^k, t_{i,val}^k), i \in [1,r], k \in [4,5,6], val \in [max, mid, min]\}$ of the linear axis at the three measurement speeds, $a_{i,val}^k$ is the $k^\#$ accelerometer's output signal at the i-th measuring point under the condition that the measuring speed is val, $\omega_{i,val}^k$ is the $k^\#$ accelerometer's output signal at the i-th measuring point under the condition that the measuring speed is val, r is the number of points on the section track, k is the accelerometer's number, $t_{i,val}^k$ is the $k^\#$ accelerometer's measuring time at the i-th measuring point under the condition that the measuring speed is val as shown in equation (4):

$$\begin{cases} t_{i,max}^k = \dfrac{i-1}{f_{max}} \\ t_{i,mid}^k = \dfrac{i-1}{f_{mid}} \\ t_{i,min}^k = \dfrac{i-1}{f_{min}} \end{cases} \quad (4)$$

$t_{i,max}^k$ is the $k^\#$ accelerometer's measuring time at the i-th measuring point under the high speed condition. $t_{i,mid}^k$ is the $k^\#$ accelerometer's measuring time at the i-th measuring point under the middle speed condition. $t_{i,min}^k$ is the $k^\#$ accelerometer's measuring time at the i-th measuring point under the low speed condition.

The fourth step is to correct the angular error of the linear axis based on the Kalman filter.

In the method, set $\theta_{i,val}^k\_a$ as the deflection angle measured by the accelerometer at the measurement speed val at the i-th measurement point, where k=1, 2, 3 represent the measured pitch angle $\theta_{i,val}^1\_a$, yaw angle $\theta_{i,val}^2\_a$ and roll angle $\theta_{i,val}^3\_a$ respectively; firstly, the deflection angle is measured by the three-axis accelerometer at each measuring point at different speeds, as shown in equation (5):

$$\begin{cases} \theta_{i,val}^1\_a = \arctan\left(\dfrac{a_{i,val}^3}{a_{i,val}^1}\right) \\ \theta_{i,val}^2\_a = \arctan\left(\dfrac{a_{i,val}^2}{a_{i,val}^1}\right) \\ \theta_{i,val}^3\_a = \arctan\left(\dfrac{a_{i,val}^2}{a_{i,val}^3}\right) \end{cases} \quad (5)$$

Then, set the initial value, and use the deflection angle $\theta_{1,val}^k\_a$ at the first measurement point measured by the $k^\#$ accelerometer as the corrected deflection angle $\theta_{1,val}^{+,k}\_g$ at the first measurement point measured by the 4# single-axis gyroscope 4, 5# single-axis gyroscope 5, and the 6# single-axis gyroscope 6 under the condition that the measurement speed is val, where k=1, 2, 3. Set the k# single-axis gyroscope under the condition that the measuring speed is val, The covariance of the first measuring point's corrected deflection angle could be any non-zero value, where k=4, 5, 6.

Next, iteratively calculate the deflection angle of each measuring point of the linear axis, as shown in equation (6):

$$\theta_{i,val}{}^k\_g = \theta_{i-1,val}{}^{+,k}\_g + \omega_{i-1,val}{}^k/f_{val} \quad (6)$$

where, $i \in [2,r]$, $\theta_{i,val}{}^k\_g$ is the deflection angle measured by the $k^\#$ single-axis gyroscope at the measurement speed val at the i-th measurement point, where k=4, 5, 6; $\theta_{i-1,val}{}^{+,k}\_g$ is the corrected deflection angle of the (i−1)-th measuring point of the $k^\#$ single-axis gyroscope under the condition that the measuring speed is val, where k=4, 5, 6.

Then find the value of the corrected deflection angle based on the measured value, as in equation (7):

$$\theta_{i,val}{}^{+,k}\_g = \theta_{i,val}{}^k\_g + K_{i,val}{}^k \cdot (\theta_{i,val}{}^{k-3}\_a - \theta_{i,val}{}^k\_g) \quad (7)$$

where k=4, 5, 6, and $K_{i,val}{}^k$ is the Kalman filter gain of the i-th measuring point of the $k^\#$ single-axis gyroscope under the condition that the measuring speed is val, as in equations (8) (9) (10):

$$K_{i,val}^k = \frac{P_{i,val}^k}{P_{i,val}^k + R_{i,val}^k} \quad (8)$$

$$P_{i,val}^k = P_{i-1,val}^{+,k} + Q_{i-1,val}^k \quad (9)$$

$$P_{i,val}^{+,k} = P_{i,val}^k - K_{i,val}^k \times P_{i,val}^k \quad (10)$$

where, $P_{i,val}{}^k$ is the covariance of the i-th measuring point's measured deflection angle of the $k^\#$ single-axis gyroscope under the condition that the measuring speed is val. $P_{i,val}{}^{+,k}$ is the covariance of the i-th measuring point's corrected deflection angle of the $k^\#$ single-axis gyroscope under the condition that the measuring speed is val. $Q_{i,val}{}^k$ is the measuring noise variance of the i-th measuring point of the $k^\#$ single-axis gyroscope under the condition that the measuring speed is val, where k=4, 5, 6. $R_{i,val}{}^k$ is the measuring noise variance of the i-th measuring point of the $k^\#$ single-axis gyroscope under the condition that the measuring speed is val, where k=1, 2, 3.

The equations (6) to (10) are repeatedly and continuously calculated and the measured corrected deflection angle subset $\Theta_{k,val}$ of the linear axis at three measurement speeds is calculated, where $\Theta_{k,val} = \{(\theta_{i,val}{}^{+,k}\_g, l_i{}^I), i \in [1,r], k \in [4,5,6], val \in [max,mid,min]\}$, and $l_i{}^I$ is the measuring distance of the i-th measuring point along the I direction, as in equation (11):

$$l_i^I = v_{max}^I \times \frac{i-1}{f_{max}^I} \quad (11)$$

where $v_{max}{}^I$ represents the high speed motion in the I direction, $f_{max}{}^I$ is the sampling frequency of the accelerometer under the high speed motion in the I direction;

The fifth step is the filtering based on the spatial frequency's continuous conditions and data fusion.

First, measure and obtain the measured deflection angle subsets $\Theta_{k,max}$ $\Theta_{k,mid}$ and $\Theta_{k,min}$ of the I direction motion axis under high speed $v_{max}{}^I$, medium speed $v_{mid}{}^I$ and low speed $v_{min}{}^I$ measurement conditions; and then filter the measurement subset, the upper limit frequency $f_{u,val}$ and the lower limit frequency $f_{d,val}$ will then be as shown in equation (12):

$$\begin{cases} f_{u,max}^I = \frac{v_{max}}{100} \\ f_{d\,max}^I = 0 \end{cases} \quad (12\text{-}1)$$

$$\begin{cases} f_{u,mid}^I = \frac{v_{mid}}{10} \\ f_{d,mid}^I = \frac{v_{mid}}{100} \end{cases} \quad (12\text{-}2)$$

$$\begin{cases} f_{u,min}^I = \frac{v_{min}}{0.5} \\ f_{d,min}^I = \frac{v_{min}}{10} \end{cases} \quad (12\text{-}3)$$

where $f_{u,max}{}^I$ is the upper limit frequency of the high speed filtering in the I direction, and $f_{d\,max}{}^I$ is the lower limit frequency. $f_{u,mid}{}^I$ is the upper limit frequency of the filtering in the I direction at the medium speed, and $f_{d,mid}{}^I$ is the lower limit frequency. $f_{u,min}{}^I$ is the upper limit frequency of the filter in the low direction of the I direction, and $f_{d,min}{}^I$ is the lower limit frequency.

According to the above operation, the filter measurement corrected deflection angle subset $\Psi_{k,val} = \{(\eta_{i,val}{}^k, l_i), i \in [1,r], k \in [4,5,6], val \in [max,mid,min]\}$ is then obtained; wherein $\eta_{i,val}{}^k$ is the measurement corrected deflection angle signal, after it has been filtered, of the i-th measuring point of $k^\#$ single-axis gyroscope under the condition that the measurement direction speed is val; $l_i$ is the measuring distance of the i-th measuring point.

Then, add the elements in the measured displacement subset, which has been measured under the conditions of low, medium and high speed, to complete the data fusion, namely equation (13):

$$\vartheta_i^k = \eta_{i,min}^k + \eta_{i,mid}^k + \eta_{i,max}^k \quad (13)$$

Where $\eta_{i,min}{}^k$ is the corrected deflection angle signal after filtering of the i-th measuring point of $k^\#$ single-axis gyroscope under the condition that the measuring direction speed was the high speed. $\eta_{i,mid}{}^k$ is the corrected deflection angle signal after filtering of the i-th measuring point of $k^\#$ single-axis gyroscope under the condition that the measuring direction speed was the middle speed. $\eta_{i,max}{}^k$ is the corrected deflection angle signal after filtering of the i-th measuring point of $k^\#$ single-axis gyroscope under the condition that the measuring direction speed was the low speed. The set of elements $\vartheta_i^{I,k}$ is the total set of the measured corners: $\Lambda_k^I = \{\vartheta_i^k, i \in [1,r], k \in [4,5,6]\}$ Finally, the linear axis pitch angle α, the yaw angle β and the roll angle γ are calculated as in equation (14):

$$\begin{cases} \alpha = \max\{\vartheta_i^4, i \in [1,r]\} \\ \beta = \max\{\vartheta_i^5, i \in [1,r]\} \\ \gamma = \max\{\vartheta_i^6, i \in [1,r]\} \end{cases} \quad (14)$$

The invention has the beneficial effects that the accelerometers and the gyroscopes are used to measure the deflection angle of the linear motion pair in the direction of motion during uniform motion. Further obtaining a method to determine the deflection angular error of the linear motion axis, the rapid measurement of the angular error of the linear motion axis of an NC machine tool can be realized.

DESCRIPTION OF THE DRAWINGS

In the figures: 1-1# accelerometer; 2-2# single-axis accelerometer; 3-3# single-axis accelerometer; 4-4# single-axis gyroscope; 5-5# single-axis gyroscope, 6-6 # single-axis gyroscope; 7-Test box; 8-NC machine tool linear axis.

I, n, and t represent the I direction, the n direction, and the t direction respectively.

DETAILED DESCRIPTION

Specific embodiments of the present invention will be described in detail below, with reference to the figures and technical solutions.

The first step is to assemble a rapid detection device for the linear axis angular error of NC machine tools.

A three-axis accelerometer consisting of three single-axis accelerometers: $1^{\#}$ single-axis accelerometer 1, $2^{\#}$ single-axis accelerometer 2, and $3^{\#}$ single-axis accelerometer 3. Three gyroscopes constitute a three-axis gyroscope: $4^{\#}$ single-axis gyroscope 4, $5^{\#}$ single-axis gyroscope 5, and $6^{\#}$ single-axis gyroscope 6. Ensure that the measurement direction of $1^{\#}$ single-axis accelerometer 1 is the I direction; and that the measurement direction of the $2^{\#}$ single-axis accelerometer 2 is the n direction; and that the measurement direction of the $3^{\#}$ single-axis accelerometer is the t direction. Ensure that the $4^{\#}$ single-axis gyroscope 4 measures the rotation angle around the n direction coordinate axis, the starting edge of the angle is the I coordinate axis, and clockwise rotation is positive. Ensure that $5^{\#}$ single-axis gyroscope 5 measures the rotation angle around the t direction coordinate axis, the starting edge of the angle is the I coordinate axis, and counterclockwise rotation is positive. Ensure that $6^{\#}$ single-axis gyroscope 6 measures the rotation angle around the I direction coordinate axis, the starting direction of the angle is the t coordinate axis, and clockwise rotation is positive. Ensure that the three single-axis accelerometers and the three single-axis gyroscopes are fixed in the detection box 7 using nuts; the detection box 7 is then fixed on the linear shaft using the side flanges, and then the clamping of the device on the linear axis 8 of the numerical control machine tool is completed.

The second step is the measurement of the installation error of the measuring device.

First, control the linear axis I of the NC machine and move it to either end of its track. The data acquisition system of the upper computer then stores the measurement data of each $1^{\#}$, $2^{\#}$ and $3^{\#}$ single-axis accelerometer; the values of accelerometers 1, 2 and 3 are 0.00045 g, 0.00095 g, 0.9999 g respectively, and the pitch angle error $\alpha_c = \arcsin(0.00045\ g/g) = 0.025°$ and the roll angle error $\beta_c = \arcsin(0.00095\ g/\cos(0.025)g) = 0.054°$ of the measuring device will then have been obtained.

The third step is the measurement of the linear axis angular error of the NC machine tool.

Taking the linear axis deflection angle as an example, the measuring device is moved from beginning of motion axis to the other side at high speed $v_{max} = 500$ mm/s, medium speed $v_{mid} = 500/5 = 100$ mm/s and low speed $v_{min} = 500/25 = 20$ mm/s in the I direction, and the data acquisition system of the upper computer stores the coordinates of each measuring point and the output digital signal data. Among them, the maximum feed speed of the motion axis is 500 mm/s. The sampling frequency of the accelerometer under the high speed motion of the linear axis is $f_{max} = 500/0.5 \times 4 = 4000$ Hz, the sampling frequency of the accelerometer under the medium speed motion of the linear axis is $f_{mid} = 4000/500 \times 100 = 1000$ Hz, and the sampling frequency of the accelerometer under the low-speed motion of the linear axis is $f_{min} = 4000/500 \times 20 = 160$ Hz.

Figure 3:
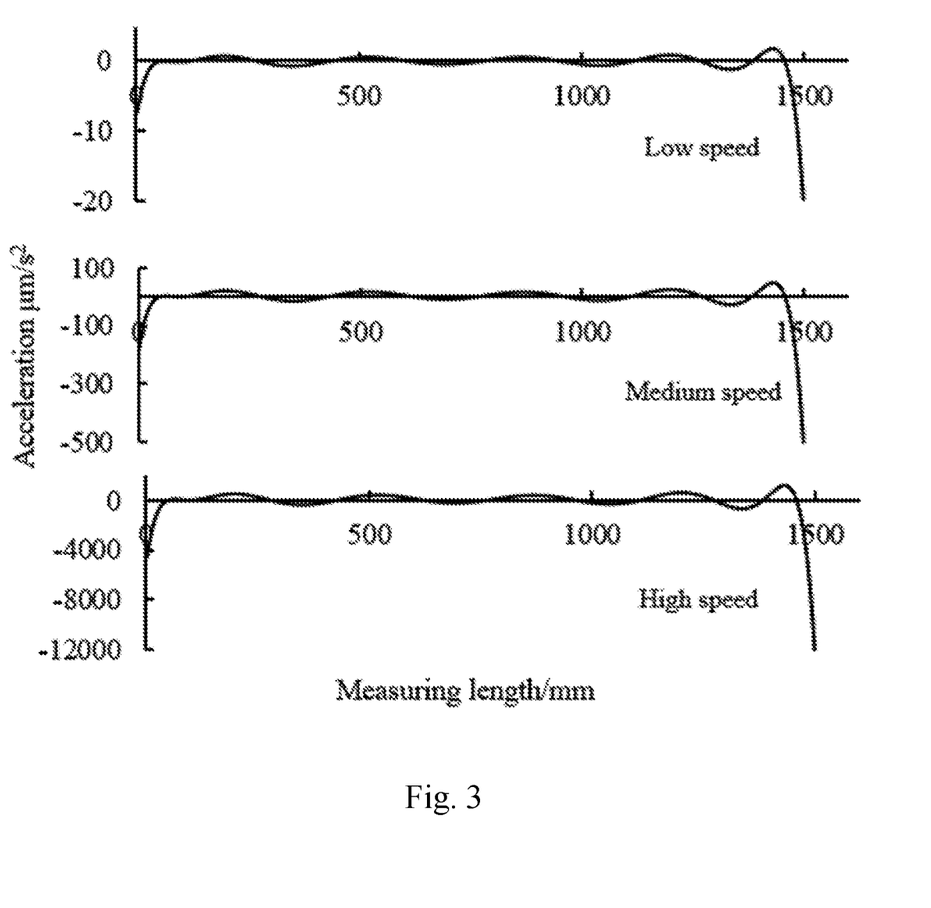
FIG. 3 shows a schematic diagram displaying the distribution of the measured acceleration subsets of the linear axis in the n direction for the three measurement speeds.
Figure 4:
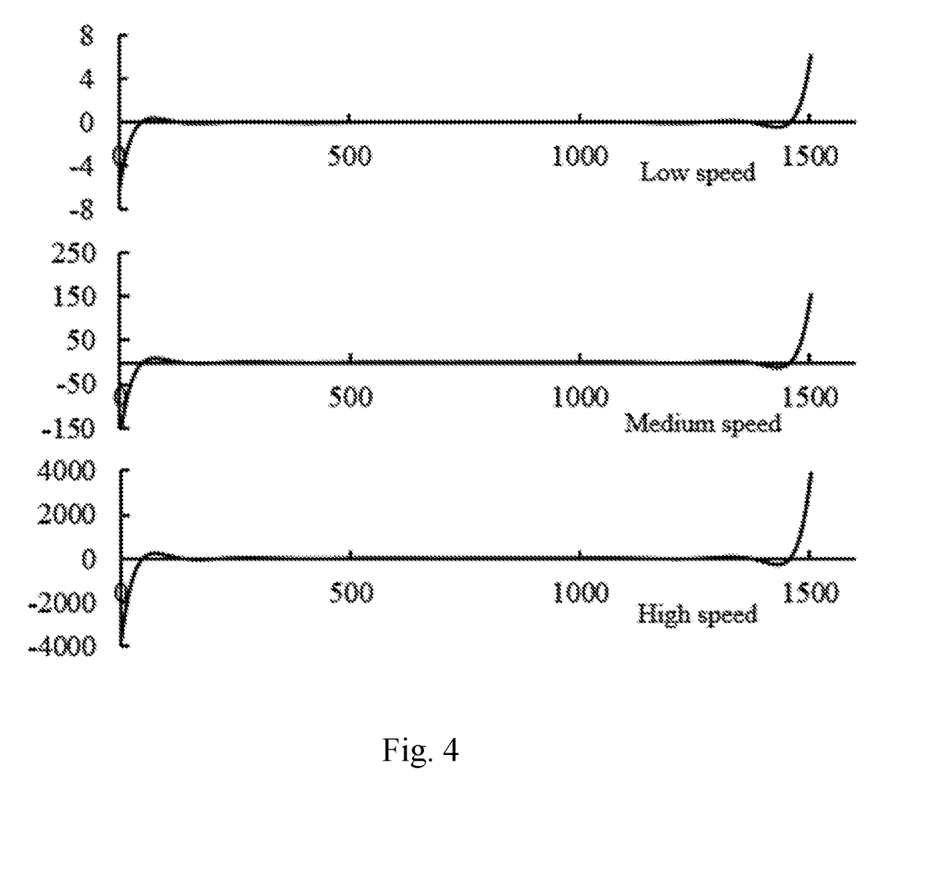
FIG. 4 shows a schematic diagram displaying the distribution of the measured acceleration subsets of the linear axis in the I direction for the three measurement speeds.
Figure 5:
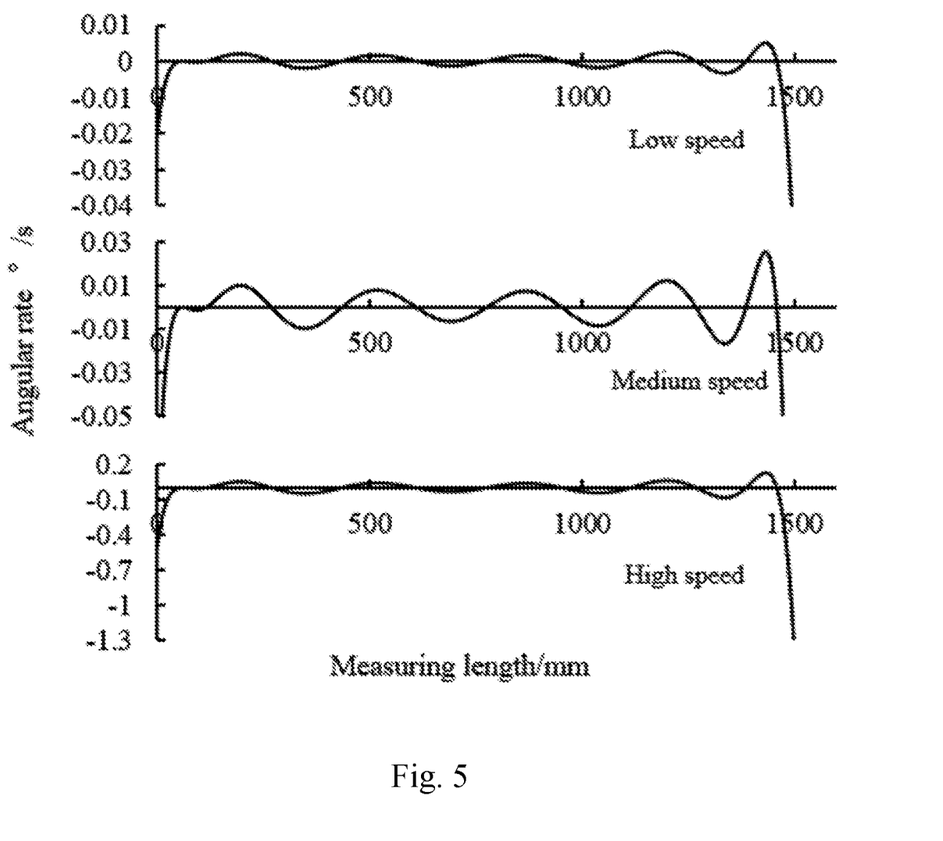
FIG. 5 shows a schematic diagram displaying the distribution of subsets of the angular rate of the linear axis around the t axis for the three measurement speeds.

The following was obtained as described above: FIG. 3—a schematic diagram showing the distribution of the measured acceleration subsets of the linear axis in the n direction for the three speeds. FIG. 4—a schematic diagram showing the distribution of the measured acceleration subsets of the linear axis in the I direction for the three speeds. FIG. 5—a schematic diagram showing the distribution of subsets of the angular rate of the linear axis around the t axis for the three speeds.

The fourth step is to correct the angular error of the linear axis based on the Kalman filter.

Figure 6:
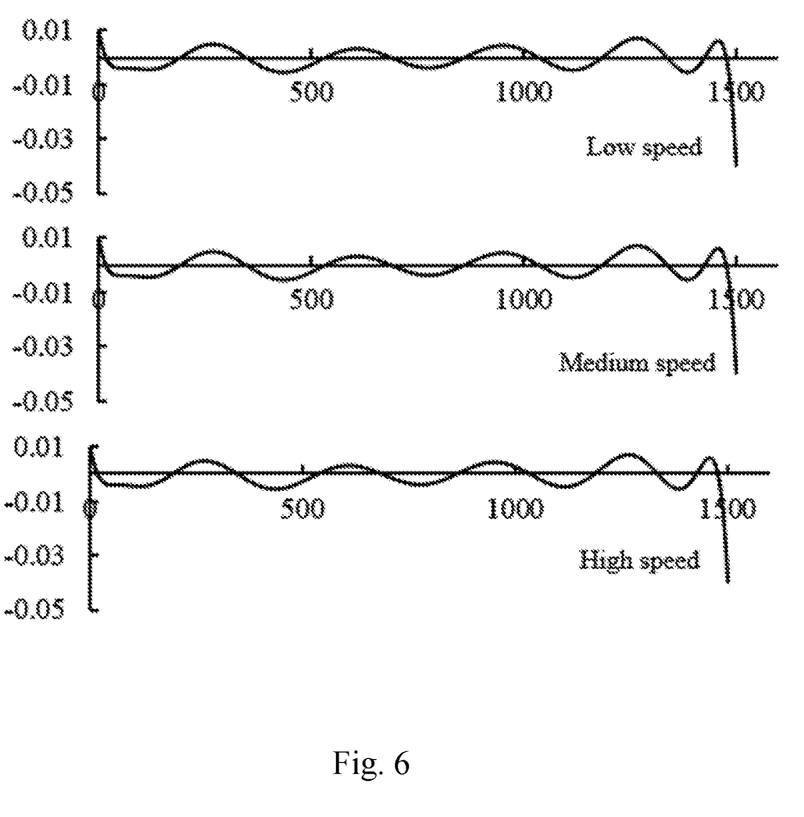
FIG. 6 shows a schematic diagram of a subset of the yaw angles of the accelerometer measured around the t axis for the three measurement speeds.

First, calculate the yaw angle measured by the 1# single-axis accelerometer 1 and 2# single-axis accelerometer 2 at each measurement point using equation (5), and then obtain FIG. 6—a schematic diagram of a subset of the yaw angles of the accelerometer measured around the t axis for the three measurement speeds.

Then set the initial value, and use the yaw angles 0.024°, 0.025°, and 0.024°, measured by the accelerometers at the first measuring point and a measuring speed of 500 mm/s, 100 mm/s, 20 mm/s, as the corrected deflection angle measured by $5^{\#}$ single-axis gyroscope 5 under the same measurement conditions. Set the covariance of the corrected deflection angle of the 5# single-axis gyroscope to 1. Set the measurement noise variance for each measuring point of the 5# single-axis gyroscope to 0.001 at each measuring speed. Then set the measurement noise variance of each single-axis accelerometer to 1 at each measuring point.

Figure 7:
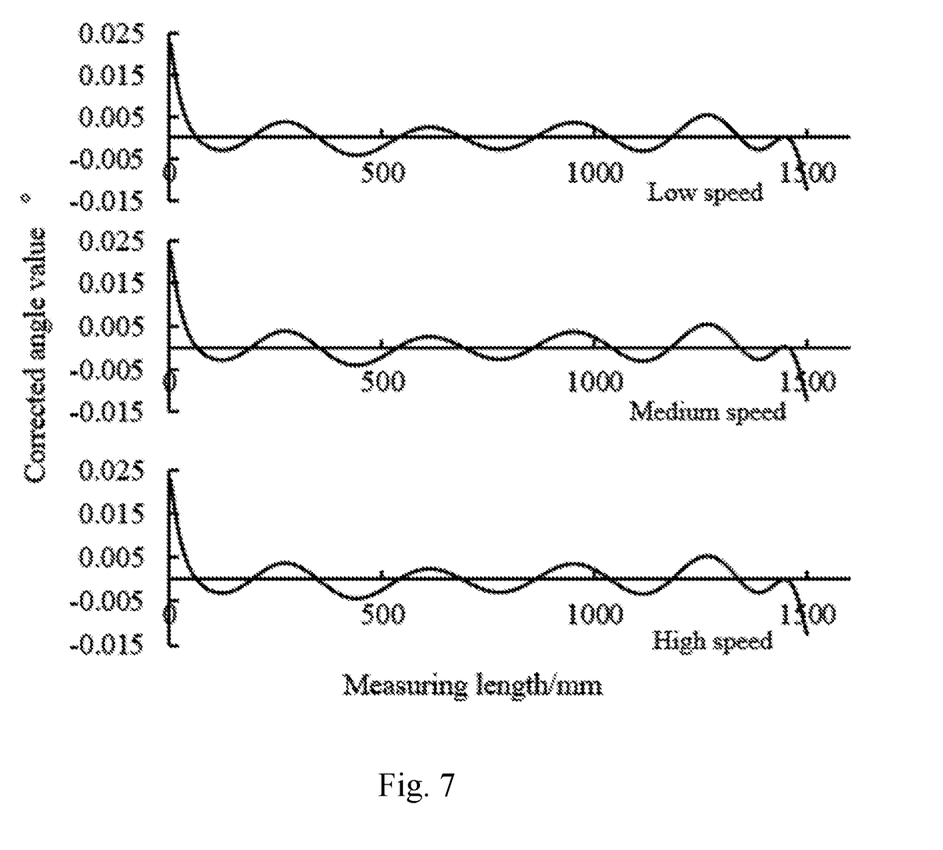
FIG. 7 shows a schematic diagram of a subset of the measured and corrected deflection angles of the linear axis around the t axis for the three measurement speeds.

Next, by calculating the values from equations (6) to (10), calculate the subset of the measured corrected deflection angles of the linear axis for the three measurement speeds. Then obtain as described above: FIG. 7—a schematic diagram of a subset of the measured corrected deflection angles of the linear axis around the t axis for the three measurement speeds.

The fifth step is the filtering based on the spatial frequency continuous conditions and data fusion.

Figure 8:
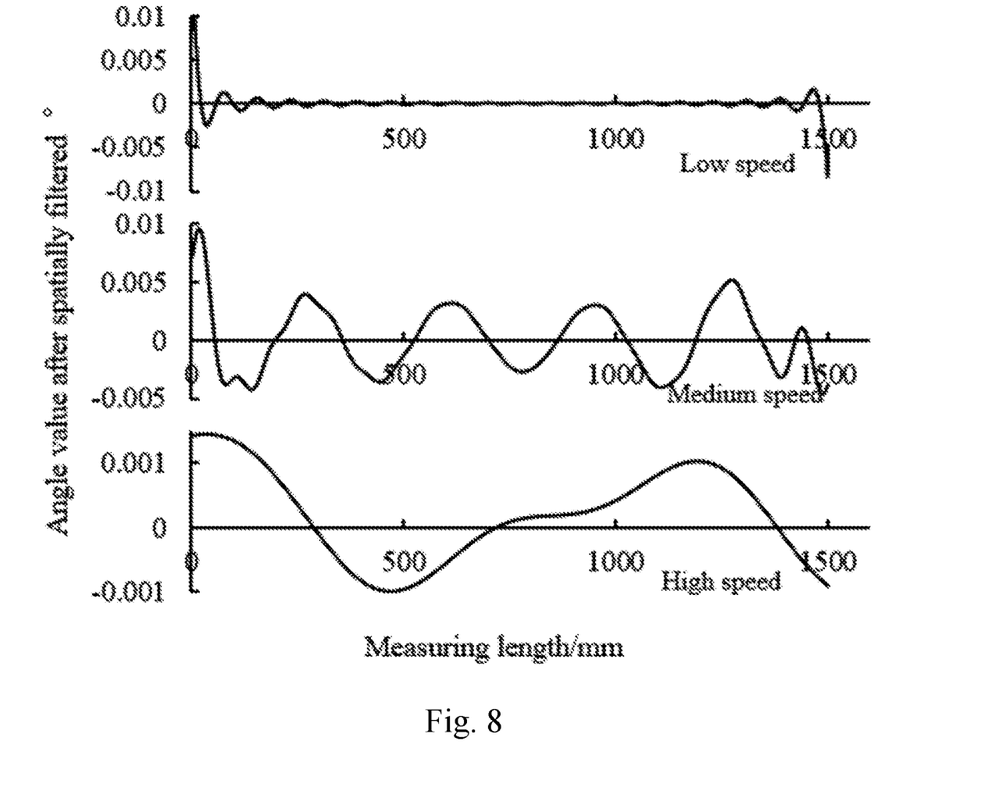
FIG. 8 shows a schematic diagram of a subset of the corrected deflection angles after filtering around the t axis.

Firstly, the measurement subset is filtered separately, and the upper limit of the filter for the determined corrected deflection angle subset under the high speed measurement condition is $f_{u,max}^I = 500/100 = 5$ Hz, and the lower limit is $f_{d\,max}{}^I=0$. The upper limit of the filter for the determined corrected deflection angle subset under the mediums peed measurement condition is $f_{u,mid}{}^I=100/10=10$ Hz, and the lower limit is $f_{d,mid}{}^I=100/100=1$ Hz. The upper limit of the filter for the determined corrected deflection angle subset under the low speed measurement condition is $f_{u,min}{}^I=20/0.5=400$ Hz, and the lower limit is $f_{d,mid}{}^I=20/10=2$ Hz. Then obtained as described above: FIG. 8—a schematic diagram of a subset of the corrected deflection angles after filtering around the t axis.

Figure 9:
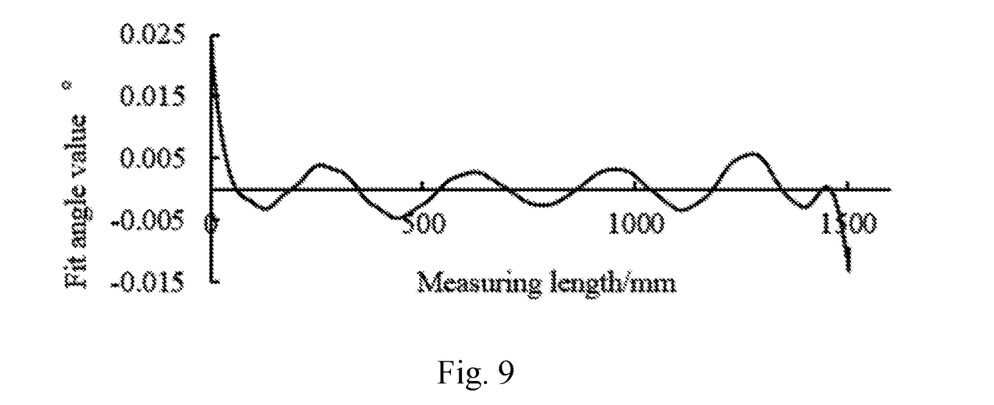
FIG. 9 shows a schematic diagram of the total set of the measured deflection angles around the taxis.

Finally, the elements in the measurement displacement subsets measured under low speed, medium speed and high speed measurement conditions are added to complete the data fusion. Then obtained as described above: FIG. 9—a schematic diagram of the total set of the measured deflection angles around the t axis. Finally, the obtained deflection angle is 0.039°.

The invention discloses a rapid detection method for the linear axis angular error of an NC machine tool. It measures the deflection angle of the linear motion pair in the direction of motion using accelerometers and gyroscopes, and then calculates the angular error of the linear motion axis, which provides the possibility for the rapid detection of the angular error of an NC machine tool.

The above method for the rapid detection of the linear axis angular error of an NC machine tool is only the preferred method of the present invention. Equivalent changes or modifications to the device made in accordance with the features and principles of the present invention are intended to be included within the scope of the present invention.

The invention claimed is:

1. A method for the rapid detection of the linear axis angular error of an NC machine tool, using gyroscopes and accelerometers to measure the deflection angle of the linear axis' uniform motion, and then calculate the pitch angle error, yaw angle error and roll angle error of the linear axis; firstly, the measuring device is mounted on the linear axis, and the initial angular error generated by the installation is determined by the accelerometers; then, the linear axis moves at three different speeds at a constant speed, and the data acquisition card automatically performs multi-channel acquisition and storage of the motion measurement's point measurement data; the Kalman filter principle is used to combine the accelerometer and gyroscope measurement angle information to obtain the angular error measured at the three speeds; then, based on the same geometric error signal, it is decomposed into the different frequency components, and the measurement angle error is filtered at the different speeds; finally, the measurement angle errors at the three speeds after filtering are superimposed to complete the rapid measurement of the linear axis angular error of the machine tool;

wherein the specific steps are as follows:

the first step is to assemble a rapid detection device for the linear axis angular error of NC machine tools;

a three-axis accelerometer is used, consisting of three single-axis accelerometers: 1# single-axis accelerometer, 2# single-axis accelerometer, and 3# single-axis accelerometer; three gyroscopes are used to constitute a three-axis gyroscope: 4# single-axis gyroscope, 5# single-axis gyroscope, and 6# single-axis gyroscope; then ensure that the measurement direction of 1# single-axis accelerometer is the I direction; 2# single-axis accelerometer measurement direction is the n direction; 3# single-axis accelerometer measurement direction is the t direction; ensure that the 4# single-axis gyroscope-4 measures the rotation angle around the n direction's coordinate axis, the starting edge of the angle is the I coordinate axis, and clockwise rotation is positive; ensure that 5# single-axis gyroscope measures the rotation angle around the t direction coordinate axis, the starting edge of the angle is the I coordinate axis, and counterclockwise rotation is positive; ensure that 6# single-axis gyroscope measures the rotation angle around the I direction coordinate axis, the starting edge of the angle is the t coordinate axis, and clockwise rotation is positive; ensure that the three single-axis accelerometers and the three single-axis gyroscopes are fixed in detection box using nuts; detection box is then fixed on the linear shaft using the side flanges, and the clamping device of the linear axis of the numerical control machine tool is then completed;

the second step is the measurement the installation error of the measuring device;

first, control the linear axis I of the NC machine and move it to either end of its track; then, the data acquisition system of the upper computer stores the measurement data of each 1# single-axis accelerometer, 2# single-axis accelerometer and 3# single-axis accelerometer which are $a_{C0}{}^1$, $a_{C0}{}^2$, $a_{C0}{}^3$ respectively, and the pitch angle error $\alpha_c$ and the roll angle error $\gamma_c$ of the measuring device are then obtained from equation (1):

$$\begin{cases} \alpha_c = \arcsin\left(-\dfrac{a_{C0}^1}{g}\right) \\ \gamma_c = \arcsin\left(\dfrac{a_{C0}^2}{g \times \cos(\alpha_c)}\right) \end{cases} \quad (1)$$

where g is the acceleration due to gravity of the measurement position; then adjust the flange nut of the test box until the pitch angle error $\alpha_c$ and the roll angle error $\gamma_c$ are within 0.1°;

the third step is the measurement of the linear axis angular error of the NC machine tool;

first, set val(val=max, mid, min) as the measuring speed of the measuring device; the three measuring speeds are high speed, medium speed and low speed; then, the measuring device is orientated in the I direction at high speed, medium speed and low speed from one side to the other of the linear axis; at the same time, the data acquisition system of the upper computer stores the coordinates of each measuring point and outputs the digital signal data at a high frequency; wherein the moving speed is calculated from equation (2):

$$\begin{cases} v_{max} = V_{max} \\ v_{mid} = \dfrac{V_{max}}{5} \\ v_{min} = \dfrac{V_{max}}{25} \end{cases} \quad (2)$$

where, $V_{max}$ is the maximum feed rate of the motion axis; the sampling frequency of the accelerometer under the high speed motion of the linear axis is $f_{max}$, the sampling frequency of the accelerometer under the middle speed motion of the linear axis is $f_{mid}$, the sampling frequency of the accelerometer under the low speed motion of the linear axis is $f_{min}$ which can be obtained from equation (3):

$$\begin{cases} f_{max} = \dfrac{v_{max}}{0.5} \times 4 \\ f_{mid} = \dfrac{f_{max}}{v_{max}} \times v_{mid} \\ f_{min} = \dfrac{f_{max}}{v_{max}} \times v_{min} \end{cases} \quad (3)$$

for the measurement obtained from the acceleration subset $A_{k,val}=\{(a_{i,val}^k, t_{i,val}^k), i \in [1,r], k \in [1,2,3], val \in [max, mid, min]\}$ and the angular rate subset $\Omega_{k,val}=\{(\omega_{i,val}^k, t_{i,val}^k), i \in [1, r], k \in [4,5,6], val \in [max, mid, min]\}$ of the linear axis at the three measurement speeds, $a_{i,val}^k$ is the $k^{\#}$ accelerometer's output signal at the i-th measuring point under the condition that the measuring speed is val, $\omega_{i,val}^k$ is the $k^{\#}$ accelerometer's output signal at the i-th measuring point under the condition that the measuring speed is val, r is the number of points on the section track, k is the accelerometer's number, $t_{i,val}^k$ is the $k^{\#}$ accelerometer's measuring time at the i-th measuring point under the condition that the measuring speed is val as shown in equation (4):

$$\begin{cases} t_{i,max}^k = \dfrac{i-1}{f_{max}} \\ t_{i,mid}^k = \dfrac{i-1}{f_{mid}} \\ t_{i,min}^k = \dfrac{i-1}{f_{min}} \end{cases} \quad (4)$$

$t_{i,max}^k$ is the $k^{\#}$ accelerometer's measuring time at the i-th measuring point under the high speed condition; $t_{i,mid}^k$ is the $k^{\#}$ accelerometer's measuring time at the i-th measuring point under the middle speed condition; $t_{i,min}^k$ is the $k^{\#}$ accelerometer's measuring time at the i-th measuring point under the low speed condition;

the fourth step is to correct the angular error of the linear axis based on the Kalman filter;

in the method, set $\theta_{i,val}^k\_a$ as the deflection angle measured by the accelerometer at the measurement speed val at the i-th measurement point, where k=1, 2, 3 represent the measured pitch angle $\theta_{i,val}^1\_a$, yaw angle $\theta_{i,val}^2\_a$ and roll angle $\theta_{i,val}^3\_a$ respectively; firstly, the deflection angle is measured by the three-axis accelerometer at each measuring point at different speeds, as shown in equation (5):

$$\begin{cases} \theta_{i,val}^1\_a = \arctan\left(\dfrac{a_{i,val}^3}{a_{i,val}^1}\right) \\ \theta_{i,val}^2\_a = \arctan\left(\dfrac{a_{i,val}^2}{a_{i,val}^1}\right) \\ \theta_{i,val}^3\_a = \arctan\left(\dfrac{a_{i,val}^2}{a_{i,val}^3}\right) \end{cases} \quad (5)$$

then, set the initial value, and use the deflection angle $\theta_{1,val}^k\_a$ at the first measurement point measured by the $k^{\#}$ accelerometer as the corrected deflection angle $\theta_{1,val}^{+,k}\_g$ at the first measurement point measured by the $4^{\#}$ single-axis gyroscope 4, $5^{\#}$ single-axis gyroscope 5, and the $6^{\#}$ single-axis gyroscope 6 under the condition that the measurement speed is val, where k=1, 2, 3; set the k# single-axis gyroscope under the condition that the measuring speed is val, the covariance of the first measuring point's corrected deflection angle could be any non-zero value, where k=4, 5, 6;

next, iteratively calculate the deflection angle of each measuring point of the linear axis, as shown in equation (6):

$$\theta_{i,val}^k\_g = \theta_{i-1,val}^k\_g + \omega_{i-1,val}^k / f_{val} \quad (6)$$

where, $i \in [2, r]$, $\theta_{i,val}^k\_g$ is the deflection angle measured by the $k^{\#}$ single-axis gyroscope at the measurement speed val at the i-th measurement point, where k=4, 5, 6; $\theta_{i-1,val}^{+,k}\_g$ is the corrected deflection angle of the (i−1)-th measuring point of the $k^{\#}$ single-axis gyroscope under the condition that the measuring speed is val, where k=4, 5, 6;

then find the value of the corrected deflection angle based on the measured value, as in equation (7):

$$\theta_{i,val}^{+,k}\_g = \theta_{i,val}^k\_g + K_{i,val}^k \cdot (\theta_{i,val}^{k-3}\_a - \theta_{i,val}^k\_g) \quad (7)$$

where k=4, 5, 6, and $K_{i,val}^k$ is the Kalman filter gain of the i-th measuring point of the $k^{\#}$ single-axis gyroscope under the condition that the measuring speed is val, as in equations (8) (9) (10):

$$K_{i,val}^k = \dfrac{P_{i,val}^k}{P_{i,val}^k + R_{i,val}^k} \quad (8)$$

$$P_{i,val}^k = P_{i-1,val}^{+,k} + Q_{i-1,val}^k \quad (9)$$

$$P_{i,val}^{+,k} = P_{i,val}^k - K_{i,val}^k \times P_{i,val}^k \quad (10)$$

where, $P_{i,val}^k$ is the covariance of the i-th measuring point's measured deflection angle of the $k^{\#}$ single-axis gyroscope under the condition that the measuring speed is val; $P_{i,val}^{+,k}$ is the covariance of the i-th measuring point's corrected deflection angle of the $k^{\#}$ single-axis gyroscope under the condition that the measuring speed is val; $Q_{i,val}^k$ is the measuring noise variance of the i-th measuring point of the $k^{\#}$ single-axis gyroscope under the condition that the measuring speed is val, where k=4, 5, 6; $R_{i,val}^k$ is the measuring noise variance of the i-th measuring point of the $k^{\#}$ single-axis gyroscope under the condition that the measuring speed is val, where k=1, 2, 3;

the equations (6) to (10) are repeatedly and continuously calculated and the measured corrected deflection angle subset $\Theta_{k,val}$ of the linear axis at three measurement speeds is calculated, where $\Theta_{k,val}=\{(\theta_{i,val}^{+,k}\_g, l_i^I), i \in [1, r], k \in [4, 5, 6], val \in [max, mid, min]\}$, and $l_i^I$ is the measuring distance of the i-th measuring point along the I direction, as in equation (11):

$$l_i^I = v_{max}^I \times \dfrac{i-1}{f_{max}^I} \quad (11)$$

where $v_{max}^I$ represents the high speed motion in the I direction, $f_{max}^I$ is the sampling frequency of the accelerometer under the high speed motion in the I direction;

the fifth step is the filtering based on the spatial frequency's continuous conditions and data fusion;

first, measure and obtain the measured deflection angle subsets $\Theta_k$, $\Theta_{k,mid}$ and $\Theta_{k,min}$ of the I direction motion axis under high speed $v_{max}^I$, medium speed $v_{mid}^I$ and low speed $v_{min}^I$ measurement conditions; and then filter the measurement subset, the upper limit frequency $f_{u,val}$ and the lower limit frequency $f_{d,val}$ will then be as shown in equation (12):

$$\begin{cases} f_{u,max}^I = \frac{v_{max}}{100} \\ f_{d\,max}^I = 0 \end{cases} \quad (12\text{-}1)$$

$$\begin{cases} f_{u,mid}^I = \frac{v_{mid}}{10} \\ f_{d,mid}^I = \frac{v_{mid}}{100} \end{cases} \quad (12\text{-}2)$$

$$\begin{cases} f_{u,min}^I = \frac{v_{min}}{0.5} \\ f_{d,min}^I = \frac{v_{min}}{10} \end{cases} \quad (12\text{-}3)$$

where $f_{u,max}^I$ is the upper limit frequency of the high speed filtering in the I direction, and $f_{d\,max}^I$ is the lower limit frequency; $f_{u,mid}^I$ is the upper limit frequency of the filtering in the I direction at the medium speed, and $f_{d,mid}^I$ is the lower limit frequency; $f_{u,min}^I$ is the upper limit frequency of the filter in the low direction of the I direction, and $f_{d,min}^I$ is the lower limit frequency; according to the above operation, the filter measurement corrected deflection angle subset $\Psi_{k,val}=\{(\eta_{i,val}^k, l_i), i \in [1,r], k \in [4,5,6], val \in [max, mid, min]\}$ is then obtained; wherein $\eta_{i,val}^k$ is the measurement corrected deflection angle signal, after it has been filtered, of the i-th measuring point of $k^\#$ single-axis gyroscope under the condition that the measurement direction speed is val; $l_i$ is the measuring distance of the i-th measuring point; then, add the elements in the measured displacement subset, which has been measured under the conditions of low, medium and high speed, to complete the data fusion, namely equation (13):

$$\vartheta_i^k = \eta_{i,min}^k + \eta_{i,mid}^k + \eta_{i,max}^k \quad (13)$$

where $\eta_{i,min}^k$ is the corrected deflection angle signal after filtering of the i-th measuring point of $k^\#$ single-axis gyroscope under the condition that the measuring direction speed was the high speed; $\eta_{i,mid}^k$ is the corrected deflection angle signal after filtering of the i-th measuring point of $k^\#$ single-axis gyroscope under the condition that the measuring direction speed was the middle speed; $\eta_{i,max}^k$ is the corrected deflection angle signal after filtering of the i-th measuring point of $k^\#$ single-axis gyroscope under the condition that the measuring direction speed was the low speed; the set of elements $\vartheta_i^{I,k}$ is the total set of the measured corners: $\Lambda_k^I = \{\vartheta_i^k, i \in [1,r], k \in [4,5,6]\}$;

finally, the linear axis pitch angle $\alpha$, the yaw angle $\beta$ and the roll angle $\gamma$ are calculated as in equation (14):

$$\begin{cases} \alpha = \max\{\vartheta_i^4, i \in [1,r]\} \\ \beta = \max\{\vartheta_i^5, i \in [1,r]\} \\ \gamma = \max\{\vartheta_i^6, i \in [1,r]\} \end{cases} \quad (14)$$

\* \* \* \* \*